Sept. 12, 1944.    C. T. RAY    2,357,849
TRACTOR TWO-ROW PLANTER ATTACHMENT
Filed Jan. 14, 1941    2 Sheets-Sheet 1
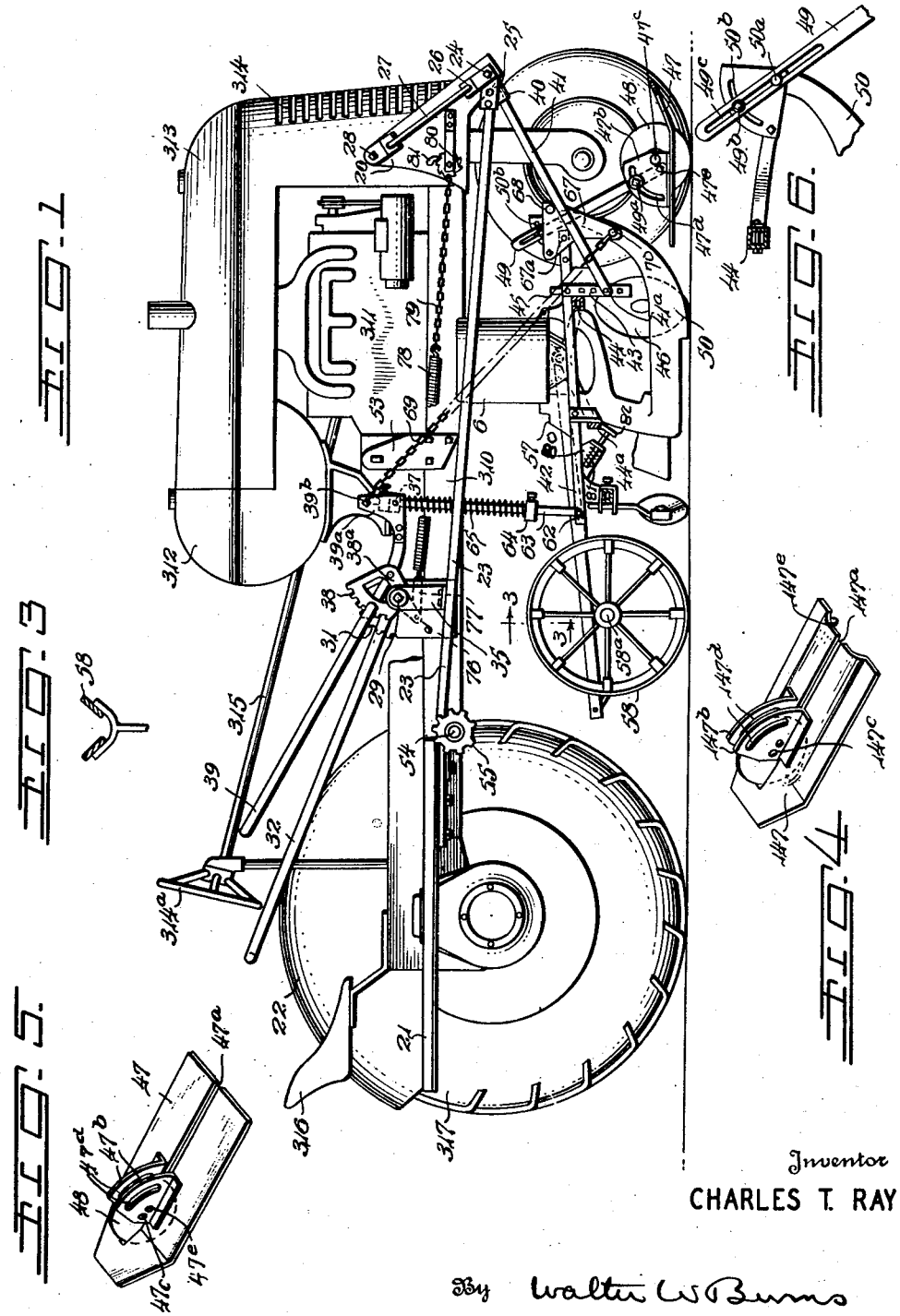
Inventor
CHARLES T. RAY
By Walter W Burns
Attorney

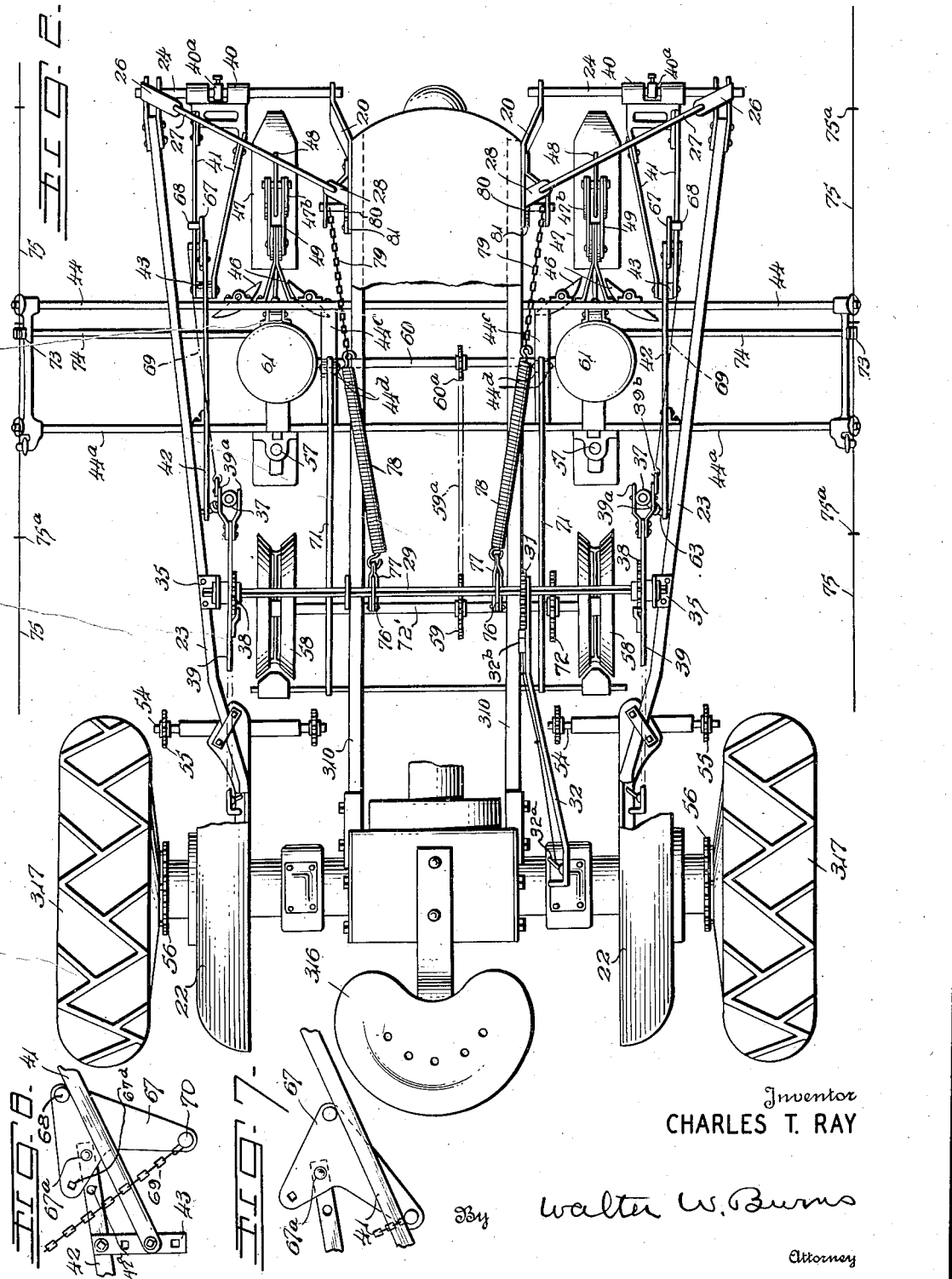

Patented Sept. 12, 1944

2,357,849

UNITED STATES PATENT OFFICE 2,357,849

TRACTOR TWO-ROW PLANTER ATTACHMENT

Charles T. Ray, Louisville, Ky., assignor to B. F. Avery and Sons Company, Louisville, Ky., a corporation of Delaware Application January 14, 1941, Serial No. 374,395

19 Claims. (Cl. 111—59)

This invention relates to planters and has particular relation to those planters wherein two-row planter unit attachments may be attached to a tractor.

The present invention involves a two-row planter which has carrying wheels and which is designed to be pulled by a tractor. It has for its primary object the provision of an improved two-row planter of this general type and of attachments for connecting it to a tractor and operating it by power derived from the tractor's forward movement.

Another object of the invention is the provision of an improved tractor two-row planter and attachment wherein the true draft principle is applied to pulling the planter from the tractor in a manner in which a vehicle is pulled by a draft animal.

A further object of the invention is the provision of such a two-row planter wherein is provided a draft bar or frame means connected at its forward end to the tractor and at its rearward end to the planter in such a manner that a sudden jerk of the tractor either in going faster or slower will not tilt the planter either to a forward or backward position relative to its normal position.

Another and still further object of the invention is the provision of a tractor two-row planter attachment with means provided for lifting both ends of the planter clear of the ground by a single operating means when the operating means is moved in one direction and when moved in the other direction to place yielding pressure on a rearward portion of the planter.

Another object of the invention is the provision of a check-row-tractor planter wherein the draft is applied in such a manner as to not affect the planting mechanism as the tractor goes over rough ground.

Still another object of the invention is the provision of an improved planter wherein the draft attachment is applied on a line passing substantially through the center of gravity.

A further object of the invention is the provision of an improved tractor attached planter wherein pressure may be applied directly through springs to a portion of the main planter frame which pressure is only indirectly applied to the rear supporting wheels and the forward supporting depth gage means whether it be of the wheel or shoe type.

Other and further objects of the invention will be apparent to those skilled in the art from a reading of the complete specification and claims.

In this specification, a check-row planter for planting two rows will be described but it is to be understood that the invention applies to other types of planters for planting a plurality of rows at the same time.

Referring to the drawings wherein is illustrated an embodiment of the invention, Fig. 1 is a side view of a tractor with the invention attached thereto, parts being omitted and other parts broken away for purposes of clearness of illustration.

Fig. 2 is a plan view of the invention attached to the sides of the tractor, parts being omitted or broken away for the sake of clearness of illustration.

Fig. 3 is a detail view taken on the line 3—3 of Fig. 1.

Figs. 4 and 5 are perspective views of different types of depth gauge shoes.

Fig. 6 is a detail fragmental view of the adjusting device for the depth gauge means.

Figs. 7 and 8 are detail views.

In the specification and drawings, the same reference characters are used to designate the same or similar parts.

Referring particularly to Figs. 1 and 2, 310 designates the frame of a tractor having an engine 311, a gasoline tank 312, a water reservoir 313 for a radiator behind the grille 314. Forward and beneath the frame 310 is a steering wheel unit which is controlled through suitable and well known worm and gear mechanism (not shown) by the steering wheel 314a and its shaft 315. On the rear portion of the frame is a seat 316 which is occupied by the operative when the tractor is in use. Rear wheels 317 are provided, which support the rear portions of the tractor and provide the traction with the ground. These wheels 317 are driven through suitable transmission mechanism from the engine 311. In Fig. 1, the near rear wheel has been omitted.

The present invention relates to check row and other types of two-row planters and is designed for use with and for attachment to a tractor. While the method and means of attachment provide for ample free and unhampered tractor movement in a vertical plane when the planter is in operation, the planter itself is supplied with its own ground-engaging supporting means, which carry the weight of the planter and its coacting parts and furnish the power for operating the planter device, derived from the forward movement of the tractor which pulls the planter.

The planter itself herein described is in general somewhat similar to some of the conventional animal drawn two-row planters but with improvements which have been found to give improved results.

The principles upon which this invention operates are those of the true draft which has always been sought by the farmer. With the animal pulling the implement forward and slightly upwardly, the farmer through the handles applies the necessary downward pressure on the rear portion of the frame to maintain proper working engagement with the ground.

Applying these principles to the tractor-attached planter, the planter has its ground-engaging supporting means close to the ground opening implement and is permitted to move up and down with the irregularities of the ground as the tractor pulls it forward and by suitable downwardly pressing means, maintains proper contact with the ground. All this will now be described in detail.

Secured to each side of the forward end of the tractor frame 310 are bearing bracket-brace plates 20. Secured to the frame 21 of the fender 22 is the rear end of a draft frame member 23, the forward end of which is secured to a draft shaft or rod 24 at its outer end by the bearing member 25. A small bracket 26 is secured to the end of the rod 24 to which is secured one end of a brace rod 27. The inner end of the brace rod 27 is secured to another small bracket 28 mounted on the plate 20.

Extending across the main frame 310 is a square shaft 29 mounted to rotate in a suitable bearing plate 30 on the left side of the machine and a quadrant plate 31 on the right side of the machine. Rigidly mounted on the shaft 29 is a lifting lever 32 which is provided with the usual grip latch lever 32a which controls the usual latch device 32b for coaction with the notches of the quadrant 31 to hold the lever 32 and the shaft 29 in their respective adjusted positions. The outer ends of the shaft 29 are journaled in suitable bearings 35 mounted on the draft frame members 23.

Adjacent the outer ends of the square shaft 29 and rigidly secured thereto are quadrants 38 which have coacting bearings 38a for pivotal support of the respective pressure adjusting levers 39. At the outer end of the levers 39 are a pair of arms 39a between which are mounted respective trunnion rings 37. Also mounted on the outer arms 39 are hooks 39b for a purpose to be later described.

In the illustrated embodiment of my invention there is a check row two-planter unit, one planter being on each side of the planter frame. Pivoted on the draft rod or shaft 24 and at each side of the tractor is a bearing member 40 rigidly secured to draft rods 41, which with the bearing member 40 form a frame. The draft rods 41 are provided at their rear ends with a pivot member 41a which is pivotally mounted to longitudinal members 42 of a main planter frame. On the forward end of the frame members 42 and having bearings for the pivot member 41a are mounted plate brackets 43 to which is rigidly secured a square cross frame member 44. Rearwardly of and parallel to the square cross frame member 44 is a second transverse frame member 44a. On each side of the center of each of the planter mechanisms is secured, on the frame member 44, a spindle 45 which at its lower end there is carried an opener disk 46. These spindles 45 are secured in place by adjustable clamps so that vertical horizontal and angular adjustments of the opener disks 46 may be made. In Fig. 1, the near opener disk has been omitted for clearness.

At the forward end of the frame is secured the forward ground engaging supporting member. As illustrated, it is a depth gauge shoe 47 having a turned up forward end. A slit 47a (see Fig. 5) is provided to accommodate a colter wheel 48. Two upstanding plates 47b are secured, one on each side of the slit and are provided with bearings for the pivot pin 47e. A pair of supporting arms 49 are pivoted on the pivot pin 47e and carry a locking bolt 49a which passes through the arcuate slots 47d of the plates 47b. By loosening the bolt 49a, the shoe 47 may be moved about the pivot pin 47e in a vertical plane to secure the desired adjustment.

In Fig. 4 is illustrated a modified form of the depth gauge shoe wherein the shoe body 147 has a slit 147a, upstanding plates 147b, each having a bearing for the pivot pin 147c and slots 147d. This shoe body 147 differs from the body 47 in that it has an upwardly curved longitudinally extending central ground contacting surface 147e.

The operation of these depth gauges is the same in that they support the forward end of the planter to which attached. In the case of the shoe 47, it makes a flat plane path while the shoe 147 leaves an elongated mound of perfect contour but with the sides packed slightly more than the top of the mound.

At the rear of the slit of the shoe 47 is the center of the ground working implement which in the illustration is a furrow opener 50 which at its forward upper end has a pivot pin 50a and an arcuate slot 50b. A bolt 49b passes through the slot 50b and secures the upper end of the pair of arms 49 in adjusted position. The arm 49 has a slot 49c which permits of vertical adjustment (see Fig. 6).

The furrow opener 50 is secured at its forward and rear ends to the main frame 42.

One the frame 310 of the tractor is a bracket 53 to which a fertilizer attachment is secured. This fertilizer attachment (not shown) is driven from the shaft 54 and the sprocket wheel 55 which is connected to sprocket wheel 56 by a sprocket chain (not shown). A boot 57 to which the fertilizer attachment is connected, is provided to guide the fertilizer to its place in the furrow. In the interest of clearness, the fertilizer attachment has been omitted as per se it is not a part of the invention.

The split wheels 58 mounted on the shaft 58a drive a sprocket wheel 59 which carries a chain 59a which drives, through sprocket 60a, a planter operating shaft 60. The ends of the shaft 60 are connected to and operate the planter mechanism of the planter 61 as indicated in Fig. 1.

In the rear ends of the frame 42 are openings 62 in which the lower ends of the rods 63 are pivoted. An adjustable ring 64 on the rod 63 regulates the lower end of the spring 65. The upper ends of the springs 65 bear against the rings 37 (see Fig. 2) while the upper ends of the rods 63 pass freely between limits through the rings 37. A chain 69 is connected detachably at its upper end to the hook 39b and at its lower end to a lifting lever 67 which lever is pivoted at 67a to the forward portion of the frame. The forward arm of the lever 67 has a projecting pin 68 which bears on the draft frame member 41. A chain 69 connects the extending pin 70, which is mounted on the lever 67, with the hook 39b already described. During the lifting operation as the chain 69 operates the lever 67, the pin 70 eventually contacts the draft bar 41. Further movement results in lifting the front end of the planter bodily.

If it is desired to have the lever 67 merely act as a lifting plate and not as a lever it is necessary only to put a bolt through the openings 42a and 67d, then holding the two members 42 and 67 rigid relative to each other. In this case any lifting action on the part of the chain 69 will lift the front end of the planter bodily.

The main frame of the planter is provided with two fore-and-aft frame members 44c which connect the forward frame member 44 with the rear frame member 44a. On these frame members 44c are located bearings which support the shaft 60 already described. Also mounted on the frame members 44c are bearing lugs 44d which support a pivot pin to which is pivoted the longitudinal members 71 of the rear frame. The two longitudinal rear frame members 71 pivotally secured to the main frame at their forward ends and to the axle housing 72' in which is the axle 58a, form a rear pivoted frame which is supported by the wheels 58. A sprocket 72 is mounted on the shaft 58 and is used to drive the windup spool (not shown) which carries the check row wire when in transport.

At the ends of the frame members 44 and 44a is located, at each side of the machine, a check row operating mechanism of any suitable or well known construction having tripping jaws 73 pivoted on the end of the shaft 74, to receive the wire 75 and permit the buttons 75a to, through the tripping jaws 73, oscillate the shaft 74 to operate the planter in a well known manner as the buttons, placed at the proper interval, pass through the tripping device. As the details of the check row device are old and well known in the art and since this device is per se not a part of this invention, a recitation of further details of its construction and operation will be omitted.

To insure the position of the pivoted frame members 40 in their positions on the draft bar 24, the locking rings 40a are provided to hold the pivoted draft frame members 42 in their adjusted positions.

The operation of the invention as a whole will now be described. As illustrated in Fig. 1, the lever 32 is in a position where if it is lowered, the whole planter will be raised and if the lever 32 is raised, the planter will be lowered so that the furrow opener 50 and the colter wheel 48 will enter the ground.

If it is desired to operate the planter, the lever 32 is raised. This revolves the shaft 29 toward the front, lowering the outer ends of the lifting arms 39a and the outer lifting ends of the levers 39. The chain 69 becomes slack and the draft bar 41 pivoted on the draft rod 24 assumes control of the forward movement of the planter. It will be observed that the pivotal axis of the rear end of the draft bar 41 is substantially on a line from the center of gravity of the frame 42 and the parts it carries, to the axis of the draft rod 24. This is the preferred embodiment, for when a sudden movement or change of speed of the tractor occurs, the planter moves bodily without having either ground engaging supporting means lifted from or forced toward the ground.

As the planter moves over the ground, the split press wheel 58 closes the trench made by the colter wheel 48, the furrow opener 50 and the disk openers 46. This press wheel also operates the planter through the shaft 58a, sprocket 59, chain 59a, sprocket 60a, and shaft 60 in the usual and well known manner.

If it is desired to move the parts to transport position, the lever 32 is moved rearwardly. This causes the adjustable heads on the rods 63 to contact the trunnion rings 37. Further movement of the lever 32, lifts the rear ends of the frames 42, at the same time, the chain 69 operates the lever 67, to first lift the front end of the frame 42 and the whole planter is lifted bodily in a vertical plane, the draft bar frame 40, swing about the draft rod 24 as a center.

When the planting operation is taking place, the forward and rearward ground engaging supporting means as the depth gauge shoe 47 and the split wheel 58, determine the movement of the sword opener 50 and its coacting parts while the flexibility of the frame members 44, 44a, take care of slight differences in the ground in the two rows.

To assist in the lifting of the planters, counterbalance devices are provided. On the shaft 29 are two downwardly extending arms 76 having links 77 to which counterbalance springs 78 are attached. At the other ends of the springs 78 are attached chains 79 which are wound on the ratchet shaft 80 held in place with a suitable dog 81.

When the planting operation is being carried out, pressure on the rear ends of the frame may be exerted by moving the lever 32 upwardly and to the front. This action causes the trunnion rings 37 to press downwardly on the springs 65 to, in turn, cause the rods 63 to press downwardly on the rear of the frame 42.

A differential in pressure between the sides may be had by adjusting either or both of the auxiliary pressure adjusting levers 39. It is to be noted, however, that whenever the lever 32 is moved, the pressure on both sides of the planter frame is varied while the differential in pressure between the two sides is maintained.

When it is desired to adjust the planters laterally with relation to the tractor, the locking ring 40a on the rod 24 is released and the bearing members 40 moved to the desired position. The locking ring 40a is then resecured.

It is to be noted that the front and rear frames are pivoted together substantially on the transverse center line of the planter. Plates 80 on the frame members 71 carry springs 81 which are held in compression between a lug on the plate 80 and the head of a bolt secured to the main or forward frame by the lug 82. The action of the spring 81 tends to raise the planter. Under control of the levers 39 and the spring 65, a counteraction to the springs 81 is set up. This counteraction varies with the adjusted position of the lever 39 and controls the resilient pressure of the press wheel on the ground.

While I have illustrated and described in detail my invention, it is to be understood that disclosure is merely illustrative and that modifications and changes may be made without departing from the spirit of the invention and within its scope as claimed.

Having described my invention, what I claim is:

1. A tractor planter attachment having a frame means, a pair of planting devices, a pair of relatively rigidly mounted ground opening devices, forward and rear ground engaging supporting means for carrying the entire weight of the ground opening devices when in operation, the forward supporting means being immediately forward of the opening means and draft means pivoted to the frame means at its rearward end between the forward and rear ground engaging supporting means and having its forward end connected to the tractor for free relative pivotal movement in a vertical plane relative to the tractor and frame.

2. A tractor planter attachment having a frame, a planting device, a ground opening device, ground engaging means for supporting the ground opening device and carrying its weight, including ground engaging means forward of and rearward of the ground opening means, and a draft means pivoted to the frame at its rearward end between the forward and rear ground engaging supporting means and having its forward end connected to the tractor, for free relative pivotal movement in a vertical plane relative to the tractor and frame.

3. A tractor planter attachment having a frame means, a pair of planting devices, a pair of relatively rigidly mounted ground opening devices, forward and rear ground engaging supporting means for carrying the entire weight of the ground opening devices when in operation, the forward supporting means being immediately forward of the opening means and draft means pivoted to the frame means at its rearward end between the forward and rear ground engaging supporting means and having its forward end connected to the tractor, for free relative pivotal movement in a vertical plane relative to the tractor and frame, the draft means being secured to the forward end of the tractor.

4. A tractor planter attachment having a frame means, a pair of planting devices, a pair of relatively rigidly mounted ground opening devices, forward and rear ground engaging supporting means for carrying the entire weight of the ground opening devices when in operation, the forward supporting means being immediately forward of the opening means and draft means pivoted to the frame means at its rearward end between the forward and rear ground engaging supporting means and having its forward end connected to the tractor for free relative pivotal movement in a vertical plane relative to the tractor and frame and means for lifting the planting devices and ground engaging supporting means clear of the ground surface for transport.

5. A tractor planter attachment having a frame means, a pair of planting devices, a pair of relatively rigidly mounted ground opening devices, forward and rear ground engaging supporting means for carrying the entire weight of the ground opening devices when in operation, the forward supporting means being immediately forward of the opening means and draft means pivoted to the frame means at its rearward end between the forward and rear ground engaging supporting means and having its forward end connected to the tractor for free relative pivotal movement relative to the tractor and frame and a single manually controlled means for lifting the planting devices and ground engaging supporting means clear of the ground surface to transport position.

6. A tractor planter attachment having a frame means, a pair of planting devices, a pair of relatively rigidly mounted ground opening devices, forward and rear ground engaging supporting means for carrying the entire weight of the ground opening devices when in operation, the forward supporting means being immediately forward of the opening means and a pair of independently pivoted draft means pivotally connected each by a single pivot at its forward ends to the tractor and at its rear ends by a single pivot to the planter frame means and between the forward and rear ground engaging supporting means.

7. A tractor planter attachment comprising a forward frame, a rearward frame, a planter means, pivotal means connecting the frames together, resilient connecting means between the frames to normally hold the planter means in an elevated position and freely vertically moving draft means for connecting one of the frames to a tractor.

8. A tractor planter attachment comprising a forward frame, a rearward frame, a planter means, pivotal means connecting the frames together, resilient connecting means between the frames to normally hold the planter means in an elevated position and adjustable means for counter-action against the resilient means and freely vertically moving draft means for connecting one of the frames to a tractor.

9. A tractor planter attachment comprising a forward frame, a rearward frame, a planter means, pivotal means connecting the frames together, resilient connecting means between the frames to normally hold the planter means in an elevated position and manually controlled adjustable resilient means for counter-action against the resilient connecting means and freely vertically moving draft means for connecting one of the frames to a tractor.

10. A tractor planter attachment comprising a forward frame, a ground working member mounted thereon, a rearward frame, a planter means supported by the frames, pivotal means between the frames, resilient connection means tending to raise the planter means, a press wheel supporting means for one of the frames, a manually controlled adjustable means for counter-action against the resilient connection means to force the ground working member of the planter into the ground and freely vertically moving draft means for connecting one of the frames to a tractor.

11. A tractor planter attachment comprising a forward frame, a ground working member mounted thereon, a rearward frame, a planter means supported by the frames, pivotal means between the frames, resilient connection means tending to raise the planter means, a press wheel supporting means for one of the frames and a manually controlled adjustable means for counter-action against the resilient connection means to force the ground working member of the planter into the ground and draft means for connecting one of the planter frames to the tractor including freely vertically moving pivotal means to give free bodily movement to the forward end of the attachment relative to the tractor.

12. A tractor planter attachment having a frame means, a pair of relatively rigidly mounted planting devices, a pair of ground opening devices, ground engaging supporting means for carrying the entire weight of the ground opening devices when in operation, freely vertically moving draft means for permitting bodily movement of the forward end of the planter frame means relative to the tractor, a lever means coacting between the draft means and frame means for raising the latter and a hand controlled means for operating the lever means.

13. A tractor planter attachment having a frame, a planting device, a ground opening means, freely vertically moving draft means for pulling the planter attachment from a tractor, lifting lever means for coaction between the draft means and planter frame and a hand-controlled means for operating the lever means.

14. A tractor planter attachment having a frame, a planting device, a freely vertically moving draft means for pulling the planter attachment from a tractor, lifting lever means for coaction between the draft means and planter frame, manually operable means connected to the lever for lifting the planter and means for rendering the lever inactive as a lever and applying the action of the manual operable means to the frame.

15. A tractor planter attachment having a frame means, a pair of relatively rigidly mounted planting devices, a pair of ground opening devices, ground engaging supporting means for carrying the entire weight of the ground opening devices when in operation, draft means pivoted to the frame means at its rearward end for free vertical movement of the planting devices at their forward ends and to the tractor at its forward end for free pivotal movement relative to the tractor and frame and a single means for varying the pressure of the frame and the planting devices toward the ground.

16. A tractor planter attachment having a frame means, a pair of relatively rigidly mounted planting devices, a pair of ground opening devices, ground engaging supporting means for carrying the entire weight of the ground opening devices when in operation, draft means pivoted to the frame means at its rearward end and to the tractor at its forward end and for free pivotal movement of the forward ends of the planting devices relative to the tractor and frame, and means for independently exerting pressure on the frame means adjacent to the respective planters.

17. A tractor planter attachment having a two-section frame hinged together, a planter means mounted on the frame, resilient means for normally holding the planter in a raised position, ground engaging supporting means including a split press wheel in line of travel of the planter, operating connections between the press wheel and planter, draft means for connecting the attachment to a tractor to provide free bodily movement up and down to the forward end of the attachment relative to the tractor when the attachment is in operation.

18. A tractor planter attachment having a two-section frame hinged together, a planter means mounted on the frame, resilient means for normally holding the planter in a raised position, ground engaging supporting means including a split press wheel in line of travel of the planter, operating connections between the press wheel and planter, draft means for connecting the attachment to a tractor to provide free bodily movement up and down to the forward end of the attachment relative to the tractor when the attachment is in operation and means on the tractor to lift the attachment bodily off the ground.

19. A tractor planter attachment comprising a planter means, a two-part pivoted frame for supporting the planter, ground engaging supporting means including a press wheel attached to one of the frame parts, a manually controlled resilient means for pressing the other frame downwardly, resilient means between the frames to counteract the action of the manually controlled resilient means and freely vertically moving draft means for connecting one of the frames to a tractor.

CHARLES T. RAY.